(12) United States Patent
Cobb

(10) Patent No.: US 8,104,220 B2
(45) Date of Patent: Jan. 31, 2012

(54) FISHING POLE WITH REPLACEABLE ILLUMINATION ELEMENT

(76) Inventor: Kenny Cobb, Vienna, WV (US)

( * ) Notice: Subject to any disclaimer, the term of this patent is extended or adjusted under 35 U.S.C. 154(b) by 200 days.

(21) Appl. No.: 12/683,979

(22) Filed: Jan. 7, 2010

(65) Prior Publication Data

US 2011/0162253 A1   Jul. 7, 2011

(51) Int. Cl.
*A01K 97/12* (2006.01)
*A01K 87/00* (2006.01)

(52) U.S. Cl. ............................................. 43/17; 43/17.5
(58) Field of Classification Search ............. 43/17, 17.5
See application file for complete search history.

(56) References Cited

U.S. PATENT DOCUMENTS

| | | | | |
|---|---|---|---|---|
| 1,340,550 A | * | 5/1920 | Madigan | 43/17 |
| 2,349,077 A | * | 5/1944 | Comparelli | 43/17 |
| 2,616,202 A | * | 11/1952 | Romberger | 43/17 |
| 2,619,559 A | * | 11/1952 | Schenkel | 43/17 |
| 2,654,972 A | * | 10/1953 | Hollingsworth | 43/17 |
| 2,722,763 A | * | 11/1955 | Miner et al. | 43/17 |
| 2,741,055 A | * | 4/1956 | Weber, Jr. | 43/17 |
| 2,798,126 A | * | 7/1957 | Burge | 43/17 |
| 2,986,835 A | * | 6/1961 | Ordinetz et al. | 43/17 |
| 3,017,499 A | * | 1/1962 | Fore | 43/17.5 |
| 3,074,196 A | * | 1/1963 | Bronson, Sr. | 43/17 |
| 3,238,659 A | * | 3/1966 | Lamb, Jr. | 43/17 |
| 3,535,018 A | * | 10/1970 | Vasilatos | 65/402 |
| 3,656,251 A | * | 4/1972 | Snider et al. | 43/17 |
| 3,862,509 A | * | 1/1975 | Petersen, Jr. | 43/17.5 |
| 4,026,059 A | * | 5/1977 | Ochs | 43/17.5 |
| 4,085,437 A | * | 4/1978 | Hrdlicka et al. | 43/17.5 |
| 4,117,618 A | * | 10/1978 | Utsler | 43/17.5 |
| 4,157,209 A | * | 6/1979 | Amendolia | 385/15 |
| 4,195,907 A | * | 4/1980 | Zamja et al. | 385/125 |
| 4,369,486 A | * | 1/1983 | Pool | 43/17.5 |
| 4,384,425 A | * | 5/1983 | Lemons, Sr. | 43/17 |
| 4,389,085 A | * | 6/1983 | Mori | 359/591 |
| 4,422,719 A | * | 12/1983 | Orcutt | 385/123 |
| 4,501,084 A | * | 2/1985 | Mori | 43/17.5 |
| 4,556,930 A | * | 12/1985 | Mori | 43/17.5 |
| 4,558,255 A | * | 12/1985 | Genovese et al. | 313/497 |
| 4,617,751 A | * | 10/1986 | Johansson | 43/17.5 |
| 4,775,920 A | * | 10/1988 | Seibert et al. | 43/17.5 |

(Continued)

FOREIGN PATENT DOCUMENTS

GB   2170081 A   *   7/1986

(Continued)

*Primary Examiner* — Darren W Ark
(74) *Attorney, Agent, or Firm* — Waters Law Group, PLLC; Robert R. Waters; Brian W. Foxworthy

(57) ABSTRACT

A fishing pole has a hollow handle and a hollow rod with their interior chambers in communication with each other. The hollow handle can receive an independent light source and also houses a concave reflector. The hollow rod contains a plastic optical fiber which extends along the length of the hollow rod and extends into the hollow handle through the concave reflector. The hollow rod has at least some portions that are translucent. The plastic optical fiber is scuffed on its end where it protrudes through the concave reflector and also in sections within the hollow rod. An independent light source inserted into the hollow handle is directed toward the concave reflector and light is directed into the plastic optical fiber, transmitted to the hollow rod, and diffused out into the hollow rod and then outside. The plastic optical fiber also rattles when the rod is moved.

16 Claims, 5 Drawing Sheets

U.S. PATENT DOCUMENTS

| | | | | |
|---|---|---|---|---|
| 4,780,980 A * | 11/1988 | McCullough | | 43/17.5 |
| 4,785,567 A * | 11/1988 | Consiglio | | 43/17.5 |
| 5,063,700 A * | 11/1991 | Kiefer et al. | | 43/17.5 |
| 5,076,003 A * | 12/1991 | Chen | | 43/17.5 |
| 5,172,508 A * | 12/1992 | Schmidt et al. | | 43/17.5 |
| 5,182,873 A * | 2/1993 | Aragon, Jr. | | 43/17 |
| 5,205,061 A * | 4/1993 | Echols, Jr. | | 43/17.5 |
| 5,276,990 A * | 1/1994 | Ramirez | | 43/17.5 |
| 5,347,741 A * | 9/1994 | Konrad | | 43/17.5 |
| 5,357,410 A * | 10/1994 | Cota et al. | | 43/17.5 |
| 5,406,735 A * | 4/1995 | Howell | | 43/17.5 |
| 5,539,624 A * | 7/1996 | Dougherty | | 362/556 |
| 5,566,493 A * | 10/1996 | Minorics | | 43/17.5 |
| 5,586,403 A * | 12/1996 | Ward | | 43/17.5 |
| 5,644,864 A * | 7/1997 | Kelly | | 43/17.5 |
| 5,708,749 A * | 1/1998 | Kacheria | | 385/123 |
| 5,719,975 A * | 2/1998 | Wolfson et al. | | 385/48 |
| 5,738,433 A * | 4/1998 | Sparks | | 43/17.5 |
| 5,826,366 A * | 10/1998 | Matibe | | 43/17.5 |
| 5,900,678 A * | 5/1999 | Rodgers | | 307/10.1 |
| 6,000,808 A * | 12/1999 | Hansen | | 43/17.5 |
| 6,122,853 A * | 9/2000 | Genous-Moore | | 43/17 |
| 6,149,286 A * | 11/2000 | Wiggins | | 43/17.5 |
| 6,405,475 B1 * | 6/2002 | Wallace et al. | | 43/17.5 |
| 6,446,380 B1 * | 9/2002 | Radosavljevic et al. | | 43/17 |
| 6,523,987 B1 * | 2/2003 | Lee | | 43/17.5 |
| 6,546,665 B1 * | 4/2003 | Eldredge et al. | | 43/17.5 |
| 6,556,753 B2 * | 4/2003 | Lee et al. | | 385/114 |
| 6,578,311 B2 * | 6/2003 | Danielson et al. | | 42/114 |
| 6,594,942 B1 * | 7/2003 | Sherwood et al. | | 43/17.5 |
| 6,694,665 B1 * | 2/2004 | Moran | | 43/17.5 |
| 6,789,348 B1 * | 9/2004 | Kneller et al. | | 43/17 |
| 6,966,685 B2 * | 11/2005 | Li et al. | | 362/616 |
| 7,003,912 B1 * | 2/2006 | Morgan et al. | | 43/17 |
| 7,051,470 B2 * | 5/2006 | Lybarger et al. | | 43/17.5 |
| 7,111,425 B1 * | 9/2006 | Cormier | | 43/17.5 |
| 7,140,144 B1 * | 11/2006 | Morgan et al. | | 43/17 |
| 7,397,984 B2 * | 7/2008 | Kuo et al. | | 385/33 |
| 7,614,177 B1 * | 11/2009 | Wheeler | | 43/17.5 |
| 7,726,860 B2 * | 6/2010 | Harrity et al. | | 362/555 |
| 7,824,054 B2 * | 11/2010 | Rigsbee et al. | | 43/17.5 |
| 2003/0131520 A1 * | 7/2003 | Bagshaw | | 43/17 |
| 2004/0055204 A1 * | 3/2004 | Allie | | 43/18.1 R |
| 2004/0159039 A1 * | 8/2004 | Yates et al. | | 43/17.5 |
| 2005/0018418 A1 * | 1/2005 | Keith et al. | | 362/109 |
| 2006/0288629 A1 * | 12/2006 | Parker et al. | | 43/17.5 |

FOREIGN PATENT DOCUMENTS

| | | | |
|---|---|---|---|
| GB | 2170084 A | * | 7/1986 |
| GB | 2175781 A | * | 12/1986 |
| GB | 2394156 A | * | 4/2004 |
| JP | 04222535 A | * | 8/1992 |
| JP | 08000130 A | * | 1/1996 |
| JP | 09252684 A | * | 9/1997 |
| JP | 2001071389 A | * | 3/2001 |
| JP | 2001299155 A | * | 10/2001 |
| JP | 2001299156 A | * | 10/2001 |
| JP | 2004313092 A | * | 11/2004 |
| JP | 2007097461 A | * | 4/2007 |

* cited by examiner

FISHING POLE WITH REPLACEABLE ILLUMINATION ELEMENT

BACKGROUND

Fishing is a common and popular pastime and profession. A large number of people participate in the activity of fishing using a fishing pole, fishing line, and hook. Frequently, a fishing line is cast out into the water, and the fishing pole set to be left by itself while being visually monitored. In this way, several fishing poles may be used at the same time. Fishing at night, however, introduces difficulties with visibility. When fishing at night, it is difficult to adequately monitor the fishing pole. Also, even when a fisherman becomes aware that there is a fish on the line, quick action requires visibility of the handle of the fishing pole. Various arrangements and developments have been made to enable fishing poles to be monitored, either by visual cues or by audible cues. However, many of these arrangements are overly complex, difficult to repair, or limited to specific light sources. Embodiments of the present invention provide a means for monitoring the fishing pole at night with both visual cues and auditory cues.

DESCRIPTION OF THE RELEVANT ART

U.S. Pat. No. 5,172,508 by Schmidt is for an illuminated fishing pole having a self-contained light source. The rod includes an at least translucent pole and a handle connected to the pole. The handle has a cavity therein which receives an end of the pole. A self contained light source, for example a hand-held flashlight, is removably housed within the cavity of the handle in operative proximity to the end of the pole. The activation switch of the light source may be accessible from the exterior of the handle. The pole may include a cavity therein open at the end connected to the handle. A plurality of fiber optic cables may be received within the pole cavity to conduct light along the pole.

U.S. Pat. No. 5,276,990 by Ramirez, is for an illuminated fishing pole, which consists of an elongated tubular tapered transparent rod. A handle is attached to a back end of the rod. A mechanism for producing illumination is carried within the handle. A structure is included for transmitting the illumination from the illumination producing mechanism through the rod to approximate a front tip end. A fisherman will have an advantage of seeing the front tip end of the rod illuminated while fishing at night.

U.S. Pat. No. 5,738,433 by Sparks, is for a lighted fishing pole which is automatically illuminated when a fish strikes the fishing line. The fishing pole includes a handle in which is provided a light bulb and a power source. The rod projecting from the handle either includes a hollow core or is provided with fiber optics which internally pass or externally wrap along the length of the rod. When a sensor mounted at the tip of the rod senses a fish strike on the fishing line, the light bulb is caused to light up and project light into the hollow core or fiber optics to cause the rod to be illuminated along its length. The fishing pole also includes a second light bulb integrated into the bottom portion of the handle which can be switched on by a fisherperson to function as a flashlight.

U.S. Pat. No. 5,586,403 by Ward, is for an illuminated fishing rod comprised of an elongated fishing rod having a plurality of eyelets arranged in a linear relationship along a length thereof. A flashlight portion is received within an open lower end of the elongated fishing rod. A light portion is electrically coupled with an upper end portion of the elongated fishing rod.

Some prior art devices require specific flashlights as light sources, while other prior art devices have built in light sources. The former approach is limiting, and the latter approach is complex. Many prior art devices provide access to the switch for the light source through the handle of the fishing pole. This access can exacerbate issues with moisture, etc. Many prior art devices utilize glass optical fiber filaments. These glass optical fiber filaments can be quite brittle, which limits their use in applications requiring minimal levels of robustness. These glass optical fiber filaments are also limited in their ability to acquire and disperse light. Optimum light acquisition requires light source alignment with the ends of the glass optical fiber filament and discharge or dispersal of the acquired light also occurs at the ends of the filaments. Prior art devices lighting a pole at several locations typically use multiple glass optical fiber filaments. Because fishing activity can occur in a wide range of temperatures, colder temperatures can magnify the brittleness of glass optical fiber filaments. Some prior art devices inherently require larger fishing poles to be effective. Any or all of the above drawbacks in prior art devices may contribute to the expense of manufacture or repair of an illuminated fishing pole as well as durability issues for such poles.

SUMMARY

In one embodiment, the fishing pole has a hollow handle which is capable of receiving an independent light source. This independent light source may be inserted through an opening at one end of the hollow handle and is not limited to a specific light source as long as it will fit within the hollow handle. On the opposite end of the hollow handle, to which the independent light source is inserted, is a generally hollow fishing rod. The rod has a larger open end and tapers to a smaller closed end, and is hollow for most of its length. The open end of the hollow rod is fixed over an opening in the end of the hollow handle.

A concave reflector is located in the end of the hollow handle on which the rod is attached, and the concave reflector is directed toward the end through which an independent light source is inserted. A plastic optical fiber runs the length of the hollow fishing rod and one end passes through the concave reflector. The plastic optical fiber typically has an inner plastic core which conducts light and an outer plastic cladding around the core which provides a refractive barrier and assists with retention of light and therefore maintains a signal over a longer distance. An example of a product line having this configuration is Mitsubishi Rayon's ESKA line of plastic optical fibers. The end of the plastic optical fiber that protrudes through the concave reflector is scuffed to assist the introduction of light into the interior of the plastic optical fiber. This avoids the need for precise alignment of a light source with the end of the optical fiber. Embodiments that employ a plastic optical fiber having a cladding have the cladding of this end scuffed. The plastic optical fiber is also affixed to the concave reflector so that it remains in position within the fishing pole, and is not attached anywhere else. Some portion of the plastic optical fiber within the hollow rod is scuffed to assist the diffusion of light from the plastic optical fiber. Embodiments that employ a plastic optical fiber having a cladding have the cladding of those portions scuffed. This section of scuffed fiber may be very short or may be for a considerable length of the plastic optical fiber within the hollow rod. The hollow rod has at least some portion that is translucent and allows light to pass from the interior of the rod as it is diffused from the plastic optical fiber out into the outside world. In addition to the visible signal emanating from the plastic optical fiber and the hollow rod, when the fishing rod is moved, the plastic optical fiber rattles and provides an audible signal that the fishing line has been tugged by a fish. More brittle glass optical fibers are not suitable for an application allowing rattling of the fiber. This is especially so where "scuffing" a glass object such as a glass fiber would entail scoring it, which introduces locations for fractures and breaks. Also the brittleness of glass fibers can be amplified by cooler temperatures. Plastic optical fibers have a much wider range of operability with some products such as Mitsubishi Rayon's ESKA lines have effective ranges from −60 degrees to 150 degrees Fahrenheit.

DESCRIPTION OF THE EMBODIMENTS

Figure 1:
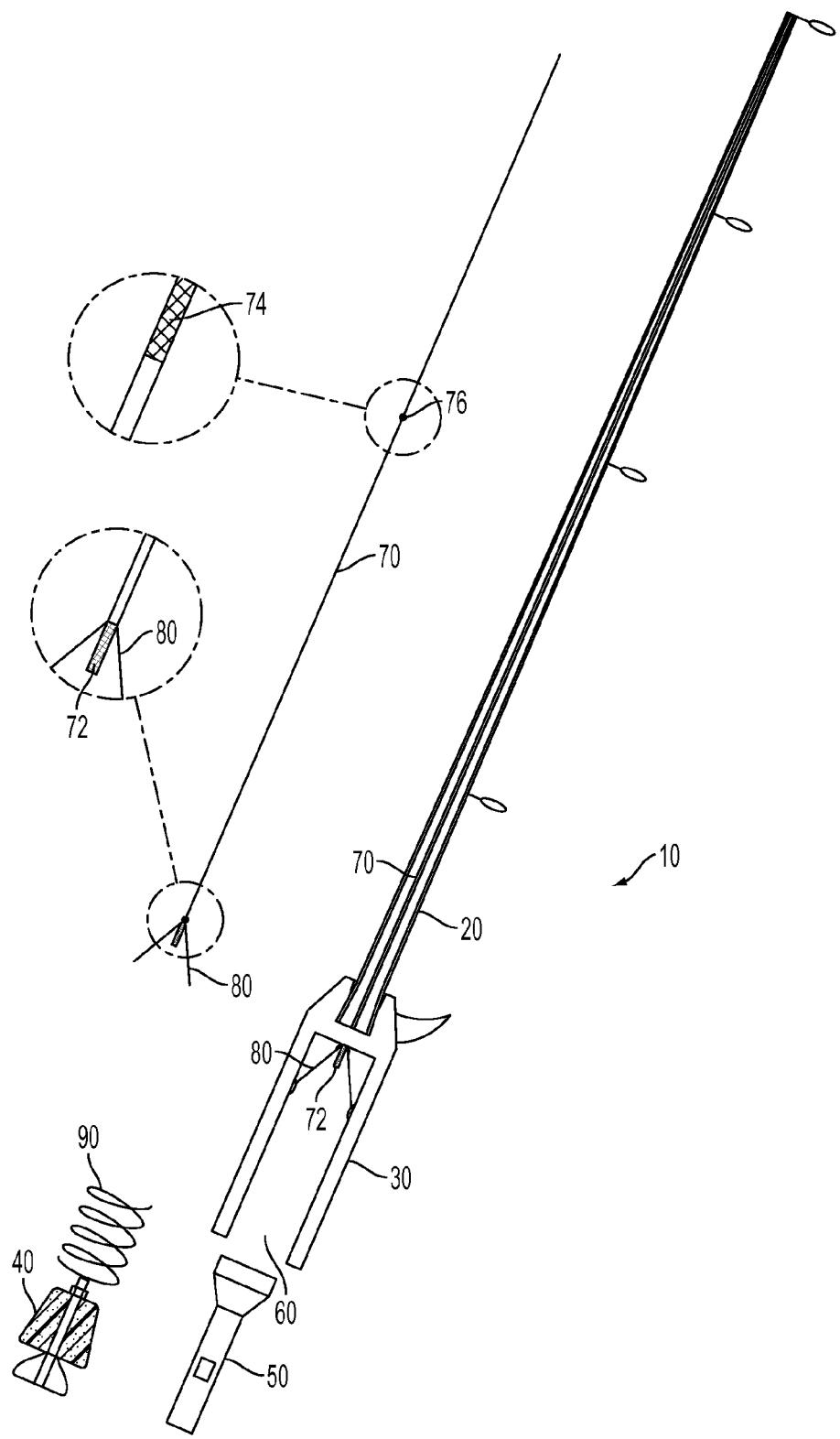
FIG. 1 is a cross-sectional view of the primary components of the fishing pole with a replaceable illumination element installed and a replaceable illumination element along side the pole.

Referring to FIG. 1, a cross-sectional view of an embodiment of the fishing pole with a replaceable illumination element is shown. The replaceable illumination element is shown both in place within the fishing pole and out along the side of it removed from the fishing pole. The fishing pole has a hollow fishing rod 20 attached to a hollow handle 30. The hollow handle is capable of receiving an independent light source 50 such as a small flashlight. The independent light source 50 may be retained by plug 40, which, in the embodiment of FIG. 1, is a deformable plug which fits into the handle. Spring 90 biases independent light source 50 up into handle 30.

Within hollow handle 30 is located concave reflector 80. Plastic optical fiber 70 protrudes through concave reflector 80 and also runs the length of hollow fishing rod 20. As may be seen in the enlarged view, the end 72 of plastic optical fiber 70 that protrudes through concave reflector 80 is scuffed on its surface. This facilitates the introduction of light into the plastic optical fiber 70, by reflection from independent light source 50, and avoids the need to have precise alignment between the light source and the plastic optical fiber 70. At the other end of plastic optical fiber 70 the surface is also scuffed to diffuse light. The enlarged section, shown at 76, shows a transition from a smooth to a scuffed surface 74. This transition may take place anywhere along the length of plastic optical fiber 70, according to any given specific embodiment. The plastic optical fiber 70 may be intermittently scuffed along its length.

Figure 7:
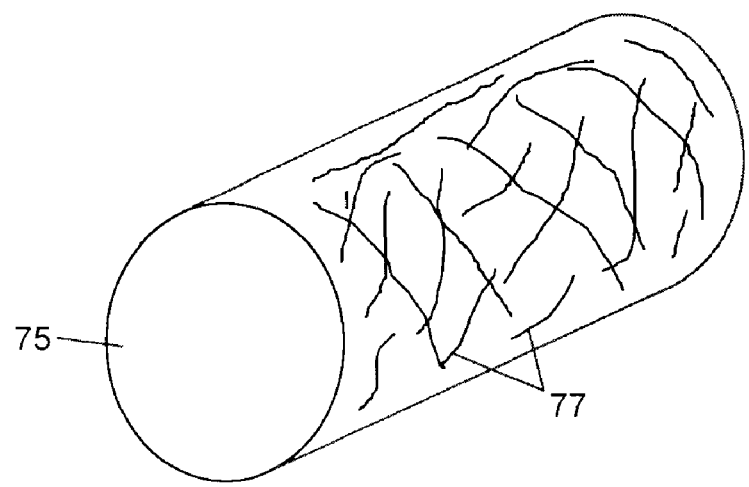
FIG. 7 is a perspective view of the end of a plastic optical fiber with scuffing on its surface.
Figure 8:
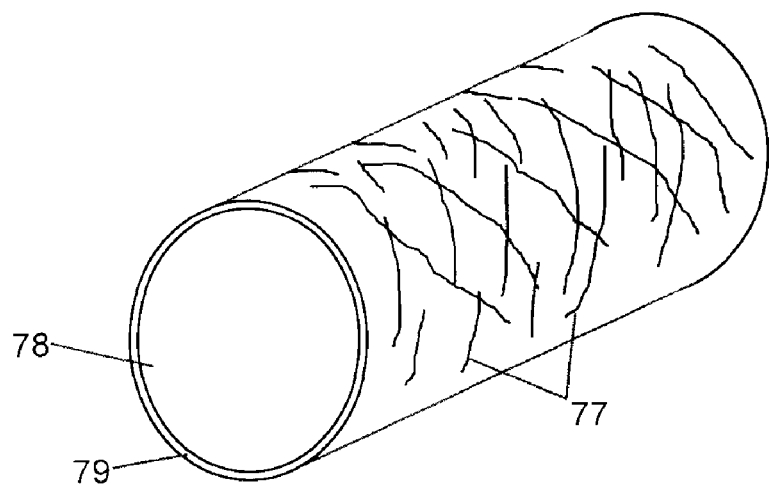
FIG. 8 is a perspective view of the end of a plastic optical fiber having a cladding layer with scuffing through the cladding layer.

Referring to FIGS. 7 and 8, some plastic optical fibers may be comprised of a simple plastic strand, such as plastic optical fiber 75 in FIG. 7, while others may have a core with cladding. In FIG. 8, the plastic optical fiber has a core 78 surrounded by a plastic cladding layer 79. Cladding 79 increases the light retention of plastic optical fibers by creating a reflective boundary due to differences in the refractive indexes of the core 78 and the cladding 79. The surfaces of the plastic optical fibers in FIGS. 7 and 8 are both scuffed as indicated at 77. In the case of the plastic optical fiber in FIG. 8, the scuffing 77 penetrates through cladding 79, allowing light to enter core 78 from the sides. Light may also exit core 78 from the sides wherever cladding 79 is scuffed through.

Referring again to FIG. 1, plastic optical fiber 70 is anchored only at concave reflector 80. This allows it freedom of movement to rattle when the fishing rod is moved by the pull of a fishing line. This provides an audible signal that a fish may be on the hook.

Figure 2:
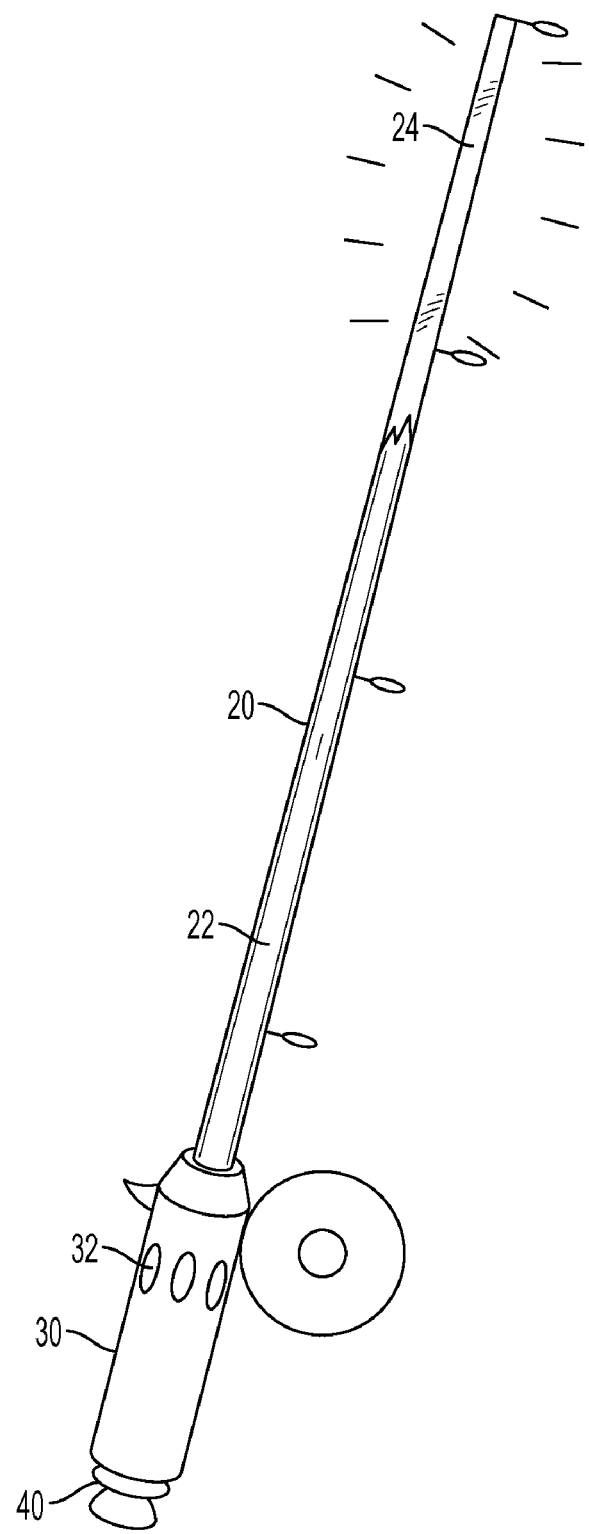
FIG. 2 is perspective view of the fishing pole of FIG. 1 accompanied by an enlarged view of a section.

FIG. 2 shows a perspective view of an embodiment of a fishing rod having a replaceable illuminating element. In the embodiment shown in FIG. 2, the free end 24 of hollow fishing rod 20 is translucent over its surface to allow light from an illumination element (see FIG. 1) to be seen passing from the fishing rod. Some embodiments of the fishing pole 10 with a replaceable illumination element may have sections of hollow rod 20 that are intermittently translucent depending on the method and materials of manufacture. The materials used to make hollow rod 20 will affect the regions of it that are translucent. In the embodiment of fishing pole 10 with a replaceable illumination element shown in FIG. 2, the larger base of hollow rod 20 is opaque. This may be due to construction from graphite fiber, for example. The smaller end of hollow rod 20 may have epoxy glass construction which will allow sections of translucency or sections of intermittent translucency. The transition of material and manufacture from one end to the other may be uneven depending on the methods and materials, and in FIG. 2, an uneven transition is portrayed.

The handle 30 of the embodiment in FIG. 2 has translucent portals 32 located around its circumference. These translucent portals 32 allow light to pass from the interior of the handle and make the handle visible during night use. This facilitates responding to a signal from the fishing pole that a fish may be on the line. FIG. 2 also shows plug 40 in handle 30 to retain the external independent light source.

Figure 3:
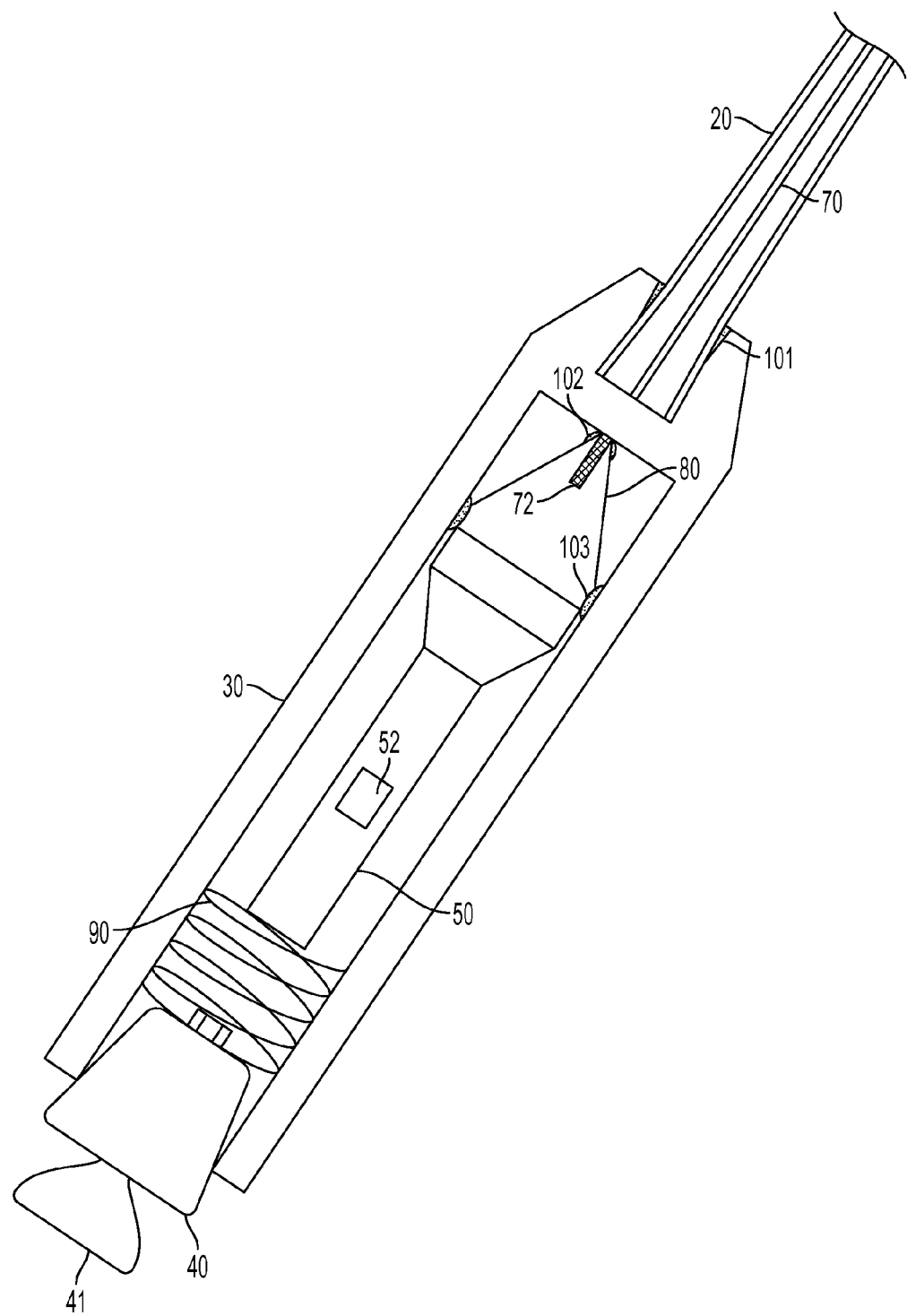
FIG. 3 is an enlarged cross section view of a handle of an embodiment of a fishing pole with a replaceable illumination element.

FIG. 3 is an enlarged, cross-sectioned view of the hollow handle 30 and hollow rod 20. In FIG. 3, the independent light source 50 is positioned within handle 30 and retained there by plug 40 which closes the open end of handle 30. Spring 90 is located between plug 40 and independent light source 50 and biases independent light source 50 toward concave reflector 80. Any specific embodiment of fishing pole 10 with a replaceable illumination element can accommodate a variety of sizes and types of independent light sources can be used, and spring 90 facilitates this ability to accommodate different sizes and types of independent light sources. The end of independent light source 50 that emits light is directed towards concave reflector 80. Concave reflector 80 collects and directs light toward the scuffed end 72 of plastic optical fiber 70 which extends through concave reflector 80. Glue beads 102 indicate glue that is used to fix plastic optical fiber 70 in concave reflector 80. Glue beads 103 indicate glue used to fix concave reflector 80 within hollow handle 30. Although the illumination element that is a combination of concave reflector 80 and plastic optical fiber 70 are glued into place by the beads 103, retaining concave reflector 80 in plastic handle 30, the assembly is easily removed when it needs to be replaced by a different illumination element. Hollow rod 20, in FIG. 3, is glued into its receptacle in hollow handle 30 with glue beads 101.

Figure 4:
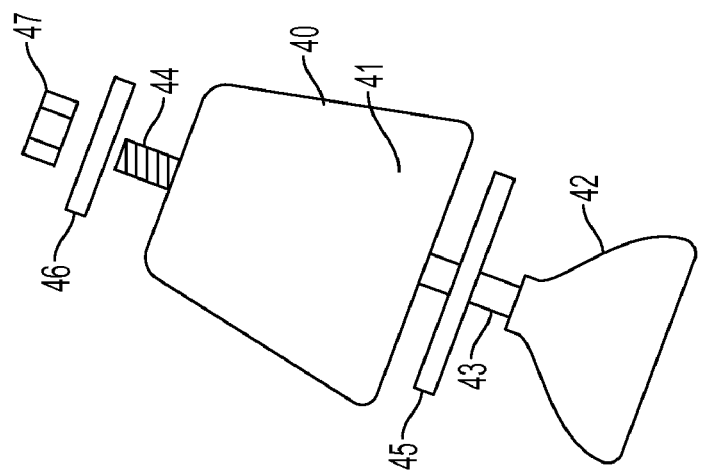
FIG. 4 is a side view of a plug for a handle of one embodiment of a fishing pole having a replaceable illumination element.

FIG. 4 shows an embodiment of plug 40. Plug 40 may have a body 41 made of a flexible material. A shaft 43 passes through the body 41 of plug 40 and has a knob 42 on one end and threads 44 on the other end. A nut 47 threads onto threads 44 of shaft 43. Nut 47 may be tightened to compress the body 41 of plug 40 to squeeze it out more tightly against the internal surface of hollow handle 30 of the various embodiments. Some embodiments of plug 40 may employ washers 45 and 46 at each end of shaft 43 to facilitate the compression, or squeezing, of plug body 41 to displace it out against the interior of a hollow handle 30. Once plug 40 is inserted into a handle 30, plug 40 may be compressed by turning knob 42, which will advance nut 47 onto threads 44 and compress body 41 of plug 40. This provides a frictional fit between the plug 40 and the hollow handle 30. Of course, plug 40 may be removed so that independent light source 50 may be inserted to illuminate fishing pole 10 or removed to be used as light source, flashlight, etc.

Figure 6:
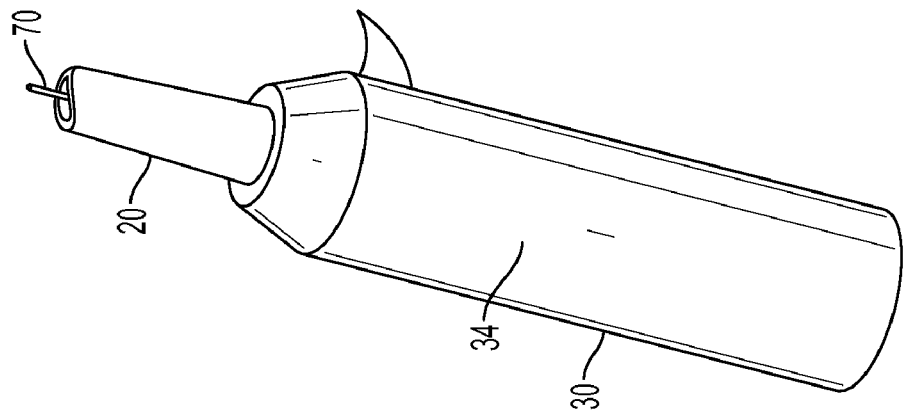
FIG. 6 is a perspective view of a handle of another embodiment of a fishing pole with a replaceable illumination element.
Figure 5:
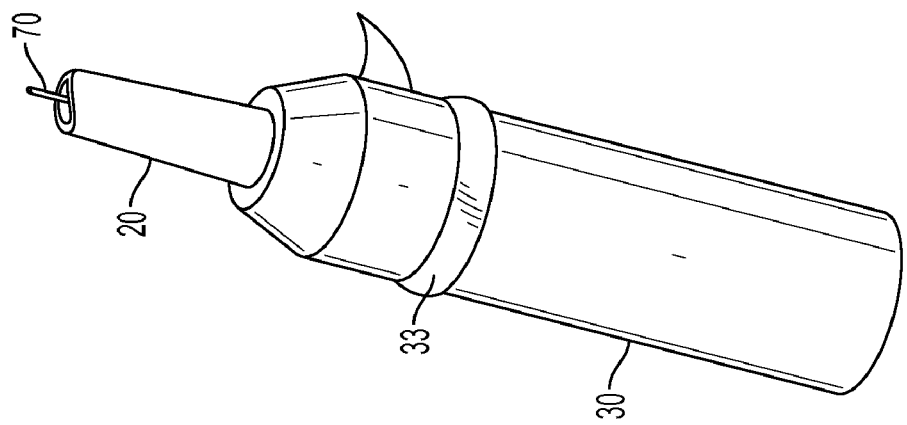
FIG. 5 is a perspective view of a handle of another embodiment of a fishing pole with a replaceable illumination element.

FIG. 5 shows an embodiment of a fishing pole with a handle having translucent ring 33 around it. Translucent ring 33 allows light to pass from the interior of hollow handle 30, providing visibility of the handle in the dark. FIG. 6 shows a hollow handle 30 which is generally translucent 34 over its entire length. Again, this provides visibility for the handle when it is dark and the independent light source is turned on inside.

It is to be understood that the embodiments and claims are not limited in application to the details of construction and arrangement of the components set forth in the description and illustrated in the drawings. Rather, the description and the drawings provide examples of the embodiments envisioned, but the claims are not limited to any particular embodiment or a preferred embodiment disclosed and/or identified in the specification. The drawing figures are for illustrative purposes only, and merely provide practical examples of the invention disclosed herein. Therefore, the drawing figures should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations. Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

Furthermore, the Abstract is neither intended to define the claims of the application, nor is it intended to be limiting to the scope of the claims in any way. It is intended that the application is defined by the claimed appended hereto.

What is claimed is:

1. A fishing pole comprising:
a hollow handle capable of receiving and retaining an independent light source, said handle having a first end and a second end, each of said first and second ends having an opening, said first end receiving said independent light source;
a hollow rod tapering from an open larger end to a smaller closed end, said open larger end being larger than said smaller closed end, said open larger end of said rod being fixed to said second end of said handle over said second end opening, said rod being comprised of opaque construction at said open larger end and transitioning to at least intermittently translucent construction at said smaller closed end;
a concave reflector within said handle in said second end of said handle, a concave surface of said reflector facing toward said first end of said handle, and;
a plastic optical fiber having a light receiving end and at least one light diffusion section, said at least one light diffusing section being located in said hollow rod proximal to said smaller closed end of said hollow rod and said light receiving end of said optical fiber protruding through said concave reflector and being fixed to said concave reflector, said light receiving end being scuffed to facilitate light entry into said plastic optical fiber and said at least one light diffusing section being scuffed to facilitate the diffusion of light from said plastic optical fiber.

2. The fishing pole of claim 1, wherein:
said concave reflector and plastic optical fiber are modularly replaceable.

3. The fishing pole of claim 1, further comprising:
a plug fitting into the opening of said first end to retain said independent light source.

4. The fishing pole of claim 3, wherein:
a body of said plug is comprised of compressible material.

5. The fishing pole of claim 4, wherein said plug further comprises:
an aperture through said body;
a shaft passing through said aperture, said shaft having a knob on one end and threads on the other end; and,
a nut threaded onto said threads.

6. The fishing pole of claim 3, further comprising:
a spring located within said hollow handle, said spring abutting said plug and biasing said independent light source toward said concave reflector.

7. The fishing pole of claim 1, wherein:
said opaque construction comprises graphite fiber construction.

8. The fishing pole of claim 1, wherein:
said at least intermittently translucent construction comprises epoxy resin.

9. The fishing pole of claim 1, wherein:
said at least intermittently translucent construction is translucent over an entire surface thereof.

10. The fishing pole of claim 1, wherein:
said handle has at least one translucent area.

11. The fishing pole of claim 10, wherein:
said at least one translucent area is a ring around a circumference of said handle.

12. The fishing pole of claim 1, wherein:
said handle is comprised of translucent material.

13. The fishing pole of claim 1, wherein:
said plastic optical fiber floats freely within said hollow rod and rattles when said fishing pole is moved.

14. The fishing pole of claim 1, wherein:
said plastic optical fiber is intermittently scuffed along its length within said hollow rod.

15. The fishing pole of claim 1, wherein:
said plastic optical fiber is comprised of a plastic core surrounded by a plastic cladding.

16. A fishing pole comprising:
- a hollow handle capable of receiving and retaining an independent light source, said handle having a first end and a second end, each of said first and second ends having an opening, said first end receiving said independent light source;
- a hollow rod tapering from an open larger end to a smaller closed end, said open larger end being larger than said smaller closed end, said open larger end of said rod being fixed to said second end of said handle over said opening, said hollow rod being translucent along its length;
- a concave reflector within said handle in said second end of said handle, a concave surface of said reflector facing toward said first end of said handle, and;
- a plastic optical fiber having a light receiving end and at least one light diffusing section, said at least one light diffusing section being located in said hollow rod proximal to said smaller closed end of said hollow rod and said light receiving end of said optical fiber protruding through said concave reflector and being fixed to said concave reflector, said light receiving end being scuffed to facilitate light entry into said plastic optical fiber and said at least one light diffusing section being scuffed to facilitate the diffusion of light from said plastic optical fiber.

* * * * *